United States Patent [19]

Iizuka et al.

[11] Patent Number: 5,287,174
[45] Date of Patent: Feb. 15, 1994

[54] VERTICAL RESOLUTION CORRECTING CIRCUIT FOR VIDEO SIGNAL

[75] Inventors: Hiroshi Iizuka, Daito; Mituzou Shirai, Habikino, both of Japan

[73] Assignee: Sanyo Electric Co., Ltd., Osaka, Japan

[21] Appl. No.: 858,549

[22] Filed: Mar. 27, 1992

[30] Foreign Application Priority Data

Apr. 5, 1991 [JP] Japan .................................. 3-73118
Apr. 10, 1991 [JP] Japan .................................. 3-77859

[51] Int. Cl.$^5$ ............................................. H04N 9/64
[52] U.S. Cl. ................................... 348/624; 358/315
[58] Field of Search ................ 358/31, 36, 37, 166, 358/167, 315, 340, 316

[56] References Cited

U.S. PATENT DOCUMENTS 4,443,817  4/1984  Faroudja .
4,926,361  5/1990  Ohtsubo et al. ................... 358/167
5,047,866  9/1991  Watanabe et al. ................. 358/36 X
5,060,056  10/1991  Miki et al. .......................... 358/36

FOREIGN PATENT DOCUMENTS 2-15784  1/1990  Japan .

*Primary Examiner*—Victor R. Kostak

[57] ABSTRACT

In a vertical resolution correcting circuit, a noncorrelation component in a vertical direction of a luminance signal included in a video signal is detected. In a region where it is considered that the detected noncorrelation component consists of vertical changes in the luminance signal itself, emphasis, which increases and decreases with a predetermined characteristic, is put on the level of a reproduced luminance signal. However, when the level of the noncorrelation component is higher than a level equal to the amplitude of a synchronizing pulse or an equalizing pulse of the video signal, emphasis is not put on the level of the reproduced luminance signal so as not to cause malfunction.

13 Claims, 8 Drawing Sheets

VERTICAL RESOLUTION CORRECTING CIRCUIT FOR VIDEO SIGNAL

BACKGROUND OF THE INVENTION

1. Field of the Invention

The present invention relates to vertical resolution correcting circuits and, more particularly, to a circuit for correcting vertical resolution of each of a luminance signal and a chroma signal which constitute a video signal.

2. Description of the Background Art

Conventionally, various techniques for correcting vertical resolution as well as reducing noise components of each of a luminance signal and a chroma signal which constitute a video signal are adopted for the purpose of improving picture quality in video recording and reproduction apparatus such as a video cassette recorder (hereinafter referred to as a VCR).

FIG. 1 is a schematic block diagram illustrating a structure of a reproduction system in a conventional VCR using such a vertical resolution correction technique as well as a noise reducing technique. Referring to FIG. 1, a video signal reproduced from a magnetic tape 1 by a reproduction head 2 is amplified by a preamplifier 3 and then applied to a high-pass filter (HPF) 4 and to a low-pass filter (LPF) 5.

A luminance signal (Y signal) is extracted from the reproduced video signal by high-pass filter 4 and applied to a luminance signal processing circuit 6. Luminance signal processing circuit 6 includes a double limiter, an FM demodulation circuit, a de-emphasis circuit, a nonlinear de-emphasis circuit, and the like, which are well known, and detailed description of them will be omitted.

Predetermined signal processing is performed on the luminance signal Y by luminance signal processing circuit 6, and the reproduced luminance signal Y is then applied to a vertical resolution correction circuit 7 and has the vertical resolution corrected. FIG. 2 is a block diagram illustrating details of a vertical resolution correcting circuit 7. Such a vertical resolution correcting circuit is disclosed, for example, in Japanese Patent Laying-Open No. 2-15784 (1990).

Referring to FIG. 2, reproduced luminance signal Y, which has been applied from luminance signal processing circuit 6 in FIG. 1 through an input terminal 20 to vertical resolution correcting circuit 7, is applied to an NH delay line (n is a positive integer, 1 in this embodiment, and H indicates a horizontal synchronization period of a video signal) 21, to a positive input of a subtracter 22, and to one input of an adder 26. Reproduced luminance signal YD, which has been delayed by a period of 1H by 1H delay line 21, is then applied to a negative input of subtracter 22 which, and subtracter 22 provides the difference between the present reproduced luminance signal Y and the reproduced luminance signal YD of 1H period before, i.e. the difference between luminance signals in two adjacent horizontal lines, as a noncorrelation luminance signal component |Y−YD| in the vertical direction. The noncorrelation signal component is applied to limiter 23 and to a positive input of a subtracter 24, while it is also applied through an output terminal 28 to vertical resolution correcting circuit 14 as illustrated in FIG. 1 to be used for vertical resolution correction of a chroma signal which will be described later. Detailed description of vertical resolution correction circuit 14 will be given later.

Limiter 23, which has a limiter level of 10·IRE, for example, passes an input having a level within the range of 0·IRE to 10·IRE as it is, and, when the level of the input is 10·IRE or more, provides a fixed output of 10·IRE. IRE is a unit expressing a level of a video signal, which expresses levels of a video signal ranging from a pedestal level to a white level of 0 to 100. The output of limiter 23 is applied to a negative input of subtracter 24. Specifically, subtracter 24 subtracts the output of limiter 23 from the input of limiter 23, so that the output from subtracter 24 is 0 when the abovedescribed noncorrelation signal component provided from subtracter 22 is at a level within the range of 0·IRE to 10·IRE, and, when the level of the noncorrelation signal component is 10·IRE or more, a signal at a level obtained by subtracting 10·IRE from the level of the noncorrelation signal component is provided. The output of subtracter 24 is multiplied by K in a K multiplying circuit 25, then applied to another input of adder 26, and added to reproduced luminance signal Y supplied from terminal 20.

FIG. 3 is a graph showing the relation between the level of the noncorrelation signal component (indicated on the abscissa) and the output of K multiplying circuit 25 (indicated on the ordinate), i.e. a characteristic of emphasis on the level of the luminance signal. Referring to FIG. 3, in view of the fact that the noncorrelation signal component |Y-YD| usually consists of only noise components in the range of 0·IRE to 10·IRE, the output of K multiplying circuit 25 is at 0 level in this range. Specifically, when the noncorrelation signal component is within the range of 0·IRE to 10·IRE, reproduced luminance signal Y is provided without emphases through a terminal 27. On the other hand, when the level of the noncorrelation signal component |Y-YD| exceeds 10·IRE, it is considered that this component is almost the original noncorrelation component of the luminance signal, so that a signal which increases according to the increase in the level of the noncorrelation component is added as an emphasis component to reproduced luminance signal Y.

As a result, in a region where the level of the noncorrelation signal component is lower than 10·IRE (a region where changes in the vertical direction of the luminance signal are even), it does not happen that the noise component is emphasized and added to reproduced luminance signal Y. However, in a region where the level of the noncorrelation signal component is 10·IRE or more, the noncorrelation signal component is added to the reproduced luminance signal, so that a contour in the vertical direction is emphasized, and resolution of the image as a whole is enhanced.

The reproduced luminance signal on which such contour emphasis processing has been performed is supplied through terminal 27 to a high-pass noise canceler (HPNC) 8 provided in a subsequent stage for reducing noise, cross modulation and beat. An output of HPNC 8 is applied to one input of an adder 9 for Y/C mixing.

A low frequency band converted chroma signal (C signal) is extracted from the reproduced video signal by low-pass filter 5 and applied to an automatic chroma controlling circuit (ACC) 10. The low frequency band converted chroma signal, which has its signal level made constant by ACC 10, has its frequency converted from 629 kHz to 3.58 MHz by a frequency converting circuit 11, to be applied through a band-pass filter (BPF) 12 to a comb filter 13. Comb filter 13 is of a well-known structure, for removing a crosstalk signal generated between adjacent tracks on a magnetic tape. An output of comb filter 13 is applied to a vertical resolution correcting circuit 14 and has the resolution in the vertical direction corrected. FIG. 4 is a block diagram illustrating details of vertical resolution correcting circuit 14. Such a vertical resolution correcting circuit is disclosed, for example, in U.S. Pat. No. 4,443,817.

Referring to FIG. 4, chroma signal C, which has been applied from comb filter 13 in FIG. 1 through an input terminal 30, is applied to one input terminal 31a of a proportional switch 31 and applied to a positive input of a subtracter 32. An output of subtracter 32 is applied to another input terminal 31b of proportional switch 31. Proportional switch 31 synthesizes the signal levels of input terminals 31a, 31b with a ratio of $k_1:k_2$ ($K_1+k_2=1$) changing according to a control signal applied to a control input terminal 31c and provides the obtained signal level through an output terminal 31d. The output from the output terminal 31d is applied to a 1H delay line 34 and to one input of an adder 35, while it is also provided as a chroma signal on which vertical resolution correction processing has been performed and applied through an output terminal 42 to adder 9 (FIG. 1) for Y/C mixing in a subsequent stage.

Chroma signal CD, which has been delayed by a period of in 1H delay line 34, is applied to another input of adder 35 and also to an n multiplying circuit (n is 0.7, for example) 33. Chroma signal CD, which has been multiplied by n in n multiplying circuit 33, is applied to a negative input of subtracter 32. As described above, signal C is applied to one input terminal 31a of proportional switch 31, and C-nCD, an output of subtracter 32, is applied to another input terminal 31b, so that the signal level at output terminal 31d is expressed as $k_1C+k_2(C-nCD)$.

Accordingly, the noise amount to be removed is increased as the value of $k_2$ is increased. In such a case, however, the ratio of CD is relatively increased, resulting in the occurrence of chromatic blur.

The above ratio of $k_1:k_2$ is changed according to the signal level at control input terminal 31c on the basis of the presence or absence of correlation of a video signal in the vertical direction for the purpose of preventing chromatic blur in the vertical direction in the boundary between colors on a reproduced image. Specifically, in a case where it is determined that a chroma signal has correlation in the vertical direction, the condition of $k=0$ and $k_2=1$ is realized, and an output of proportional switch 31, i.e. an output of vertical resolution correcting circuit 14, is C-nCD. On the other hand, in a case where it is determined that there is no correlation, the condition of $k_1=1$ and $k_2=0$ is realized, and the output is C. In an intermediate case between both the extreme cases, for example, in a case where the condition of $k_1=k_2=0.5$ is realized, the output is $0.5C+0.5(C-nCD)$.

Such determination of presence or absence of correlation in the vertical direction is performed by detecting correlation of a chroma signal and correlation of a luminance signal. Specifically, referring to FIG. 4, a noncorrelation signal component of the luminance signal supplied from output terminal 28 of vertical resolution correcting circuit 7 in FIG. 2 is applied through a terminal 38 and a LPF 39 to a rectangular wave correlation detecting circuit 40 which provides a detection output when the noncorrelation signal component of the luminance signal exceeds a predetermined threshold value. The output of rectangular wave correlation detecting circuit 40 is applied to one input of an adder 41. A noncorrelation signal component of the chroma signal provided from an adder 35 is applied through BPF 36 to a rectangular wave correlation detecting circuit 37 which provides a detection output when the noncorrelation signal component of the chroma signal exceeds a predetermined threshold value. The output of rectangular wave correlation detecting circuit 37 is applied to another input of adder 41, and an output of adder 41 is applied to a control input terminal 31c of proportional switch 31.

Specifically, in this conventional technique, generation of chromatic blur in a reproduced image is prevented by changing the ratio of synthesis in proportional switch 31 according to the degree of correlation in the vertical direction in both of a luminance signal and a chroma signal on the assumption that the degree of vertical correlation of the luminance signal has relatively strong relevance to the degree of vertical correlation of the chroma signal.

The chroma signal on which such chromatic blur preventing processing has been performed is applied through a terminal 42 to another input of adder 9 (FIG. 1) for Y/C mixing. Then, a reproduced video signal on which various vertical resolution correcting processing has been performed is provided from adder 9.

The conventional vertical resolution correcting circuit 7 illustrated in FIG. 2 has a problem as described in the following. In circuit 7 in FIG. 2, if the noncorrelation signal component of a luminance signal exceeds 10·IRE, an amount of emphasis which increases according to the noncorrelation signal component increase is added to a reproduced luminance signal as described with reference to FIG. 3, and such addition is also performed in a case where the noncorrelation component exceeds 40·IRE as shown in FIG. 3.

FIG. 5 is a partial enlarged diagram of a vertical blanking period of a video signal, wherein each of the synchronizing pulses and equalizing pulses has an amplitude of 40·IRE. Accordingly, when a noncorrelation component is detected with respect to an interval of 1H period as indicated by Ⓐ in a discontinuous part in the boundary between an equalizing period and a video period, the amplitude of the equalizing pulse, 40·IRE, is erroneously detected as the noncorrelation component of the luminance signal, and an amount of emphasis corresponding to 40·IRE is added unnecessarily to the video signal as indicated by a part Ⓑ depicted with oblique lines in FIG. 3, so that the picture quality of a reproduced image is degraded.

The conventional vertical resolution correcting circuit 14 illustrated in FIG. 4 has a problem as described in the following. According to the conventional example illustrated in FIG. 4, an output of circuit 14 is controlled on the assumption that the degree of vertical correlation of a luminance signal has relevance to the degree of vertical correlation of a chroma signal. However, in an actually reproduced video signal, there is a case where only a chroma signal changes largely although a luminance signal changes little, and there is also a case converse to it, for example. Accordingly, in such cases, there is a problem that it is impossible to perform vertical resolution correction operation on the basis of the degree of correlation of a chroma signal in circuit 14 in FIG. 4.

In addition, circuit 14 in FIG. 4 has a problem that the circuit configuration is complicated because the ratio of the proportional switch is changed on the basis of correlation detecting results of both of a luminance signal and a chroma signal.

SUMMARY OF THE INVENTION

An object of the present invention is to provide a vertical resolution correcting circuit capable of improving picture quality of a reproduced image.

Another object of the present invention is to provide a vertical resolution correcting circuit capable of correcting vertical resolution in a video signal with a simple structure.

In brief, a vertical resolution correcting circuit according to the present invention includes a signal source for supplying a luminance signal included in a video signal, a circuit for detecting a noncorrelation component in a vertical direction of the luminance signal, and a circuit for emphasizing the level of the luminance signal with a predetermined characteristic, which increases and decreases according to the level of the detected noncorrelation component, in a predetermined intermediate range included in the entire range which can be occupied by the detected noncorrelation component.

According to another aspect of the present invention, a vertical resolution correcting circuit includes a signal source for supplying a chroma signal included in a video signal, a circuit for detecting a noncorrelation component in a vertical direction of the chroma signal, a circuit for subtracting a level within a predetermined lower first range included in the whole range which can be taken by the detected noncorrelation component from the level of the supplied chroma signal, and a circuit for emphasizing the level of the chroma signal with a predetermined characteristic, which increases and decreases according to the level of the detected noncorrelation component, in a predetermined intermediate second range within the entire range which can be occupied by the detected noncorrelation component.

Accordingly, an advantage of the present invention is that the level of a luminance signal is emphasized with a predetermined characteristic when the noncorrelation component of the luminance signal has an intermediate level, so that it is possible to emphasize a contour in a vertical direction of an image without emphasizing a noise component having a low noncorrelation component level and without causing malfunction due to an equalizing pulse or a synchronizing pulse, and it is possible to enhance resolution of a reproduced image.

Another advantage of the present invention is that a low level noncorrelation component of a chroma signal is subtracted from a chroma signal, and the level of the chroma signal is emphasized with a predetermined characteristic when the noncorrelation component of the chroma signal has an intermediate level, so that it is possible to suppress a noise component at a low level and to enhance resolution of an image with a relatively simple structure and without causing malfunction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
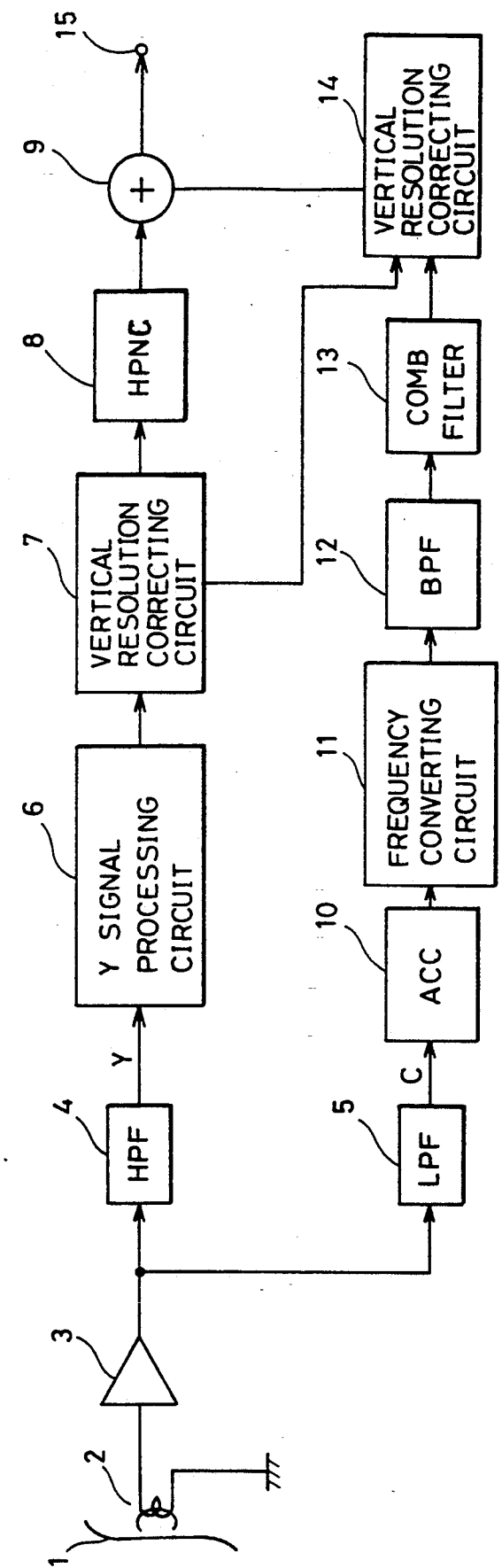
FIG. 1 is a schematic block diagram illustrating a structure of a reproduction system in a conventional VCR.
Figure 2:
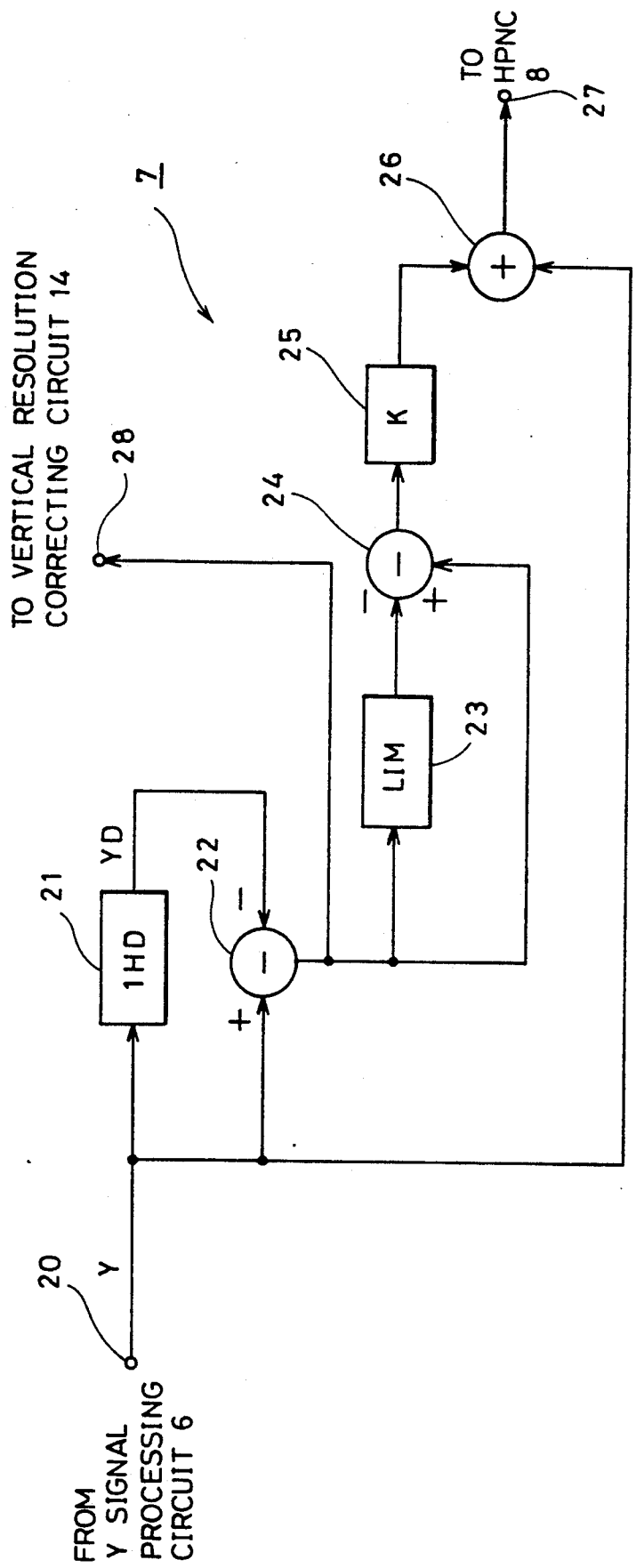
FIG. 2 is a block diagram illustrating details of a vertical resolution correcting circuit for the luminance signal illustrated in FIG. 1.
Figure 3:
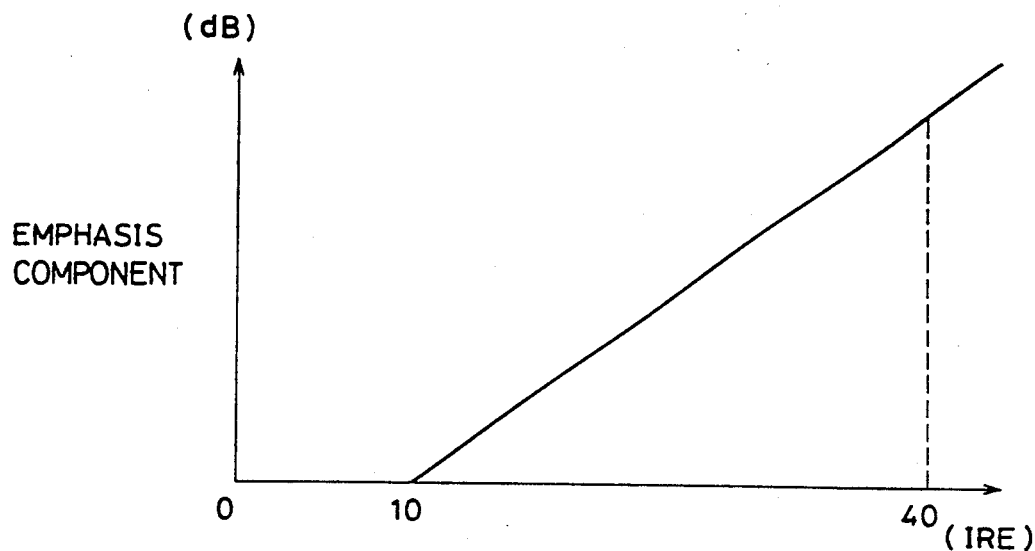
FIG. 3 is a graph showing an operating characteristic of the vertical resolution correcting circuit illustrated in FIG. 2.
Figure 5:
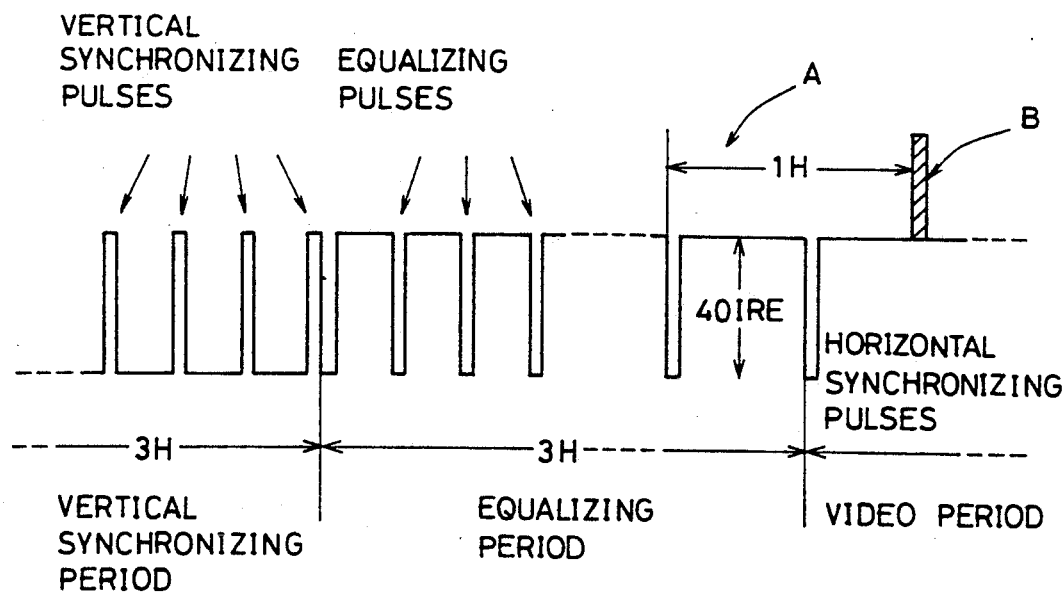
FIG. 5 is a partial enlarged diagram of a vertical blanking period of a video signal.
Figure 4:
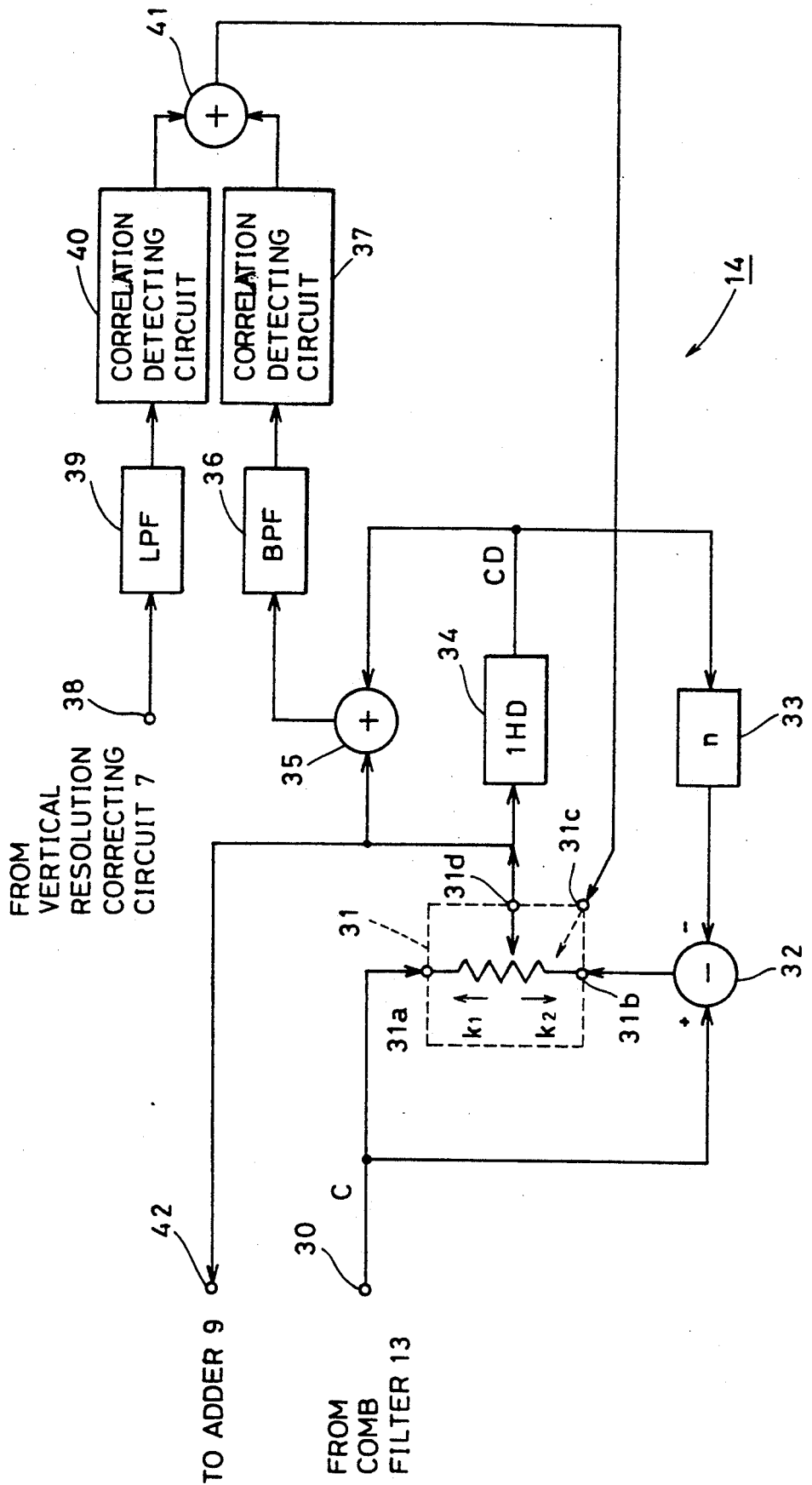
FIG. 4 is a block diagram illustrating details of a vertical resolution correcting circuit for the chroma signal illustrated in FIG. 1.
Figure 6:
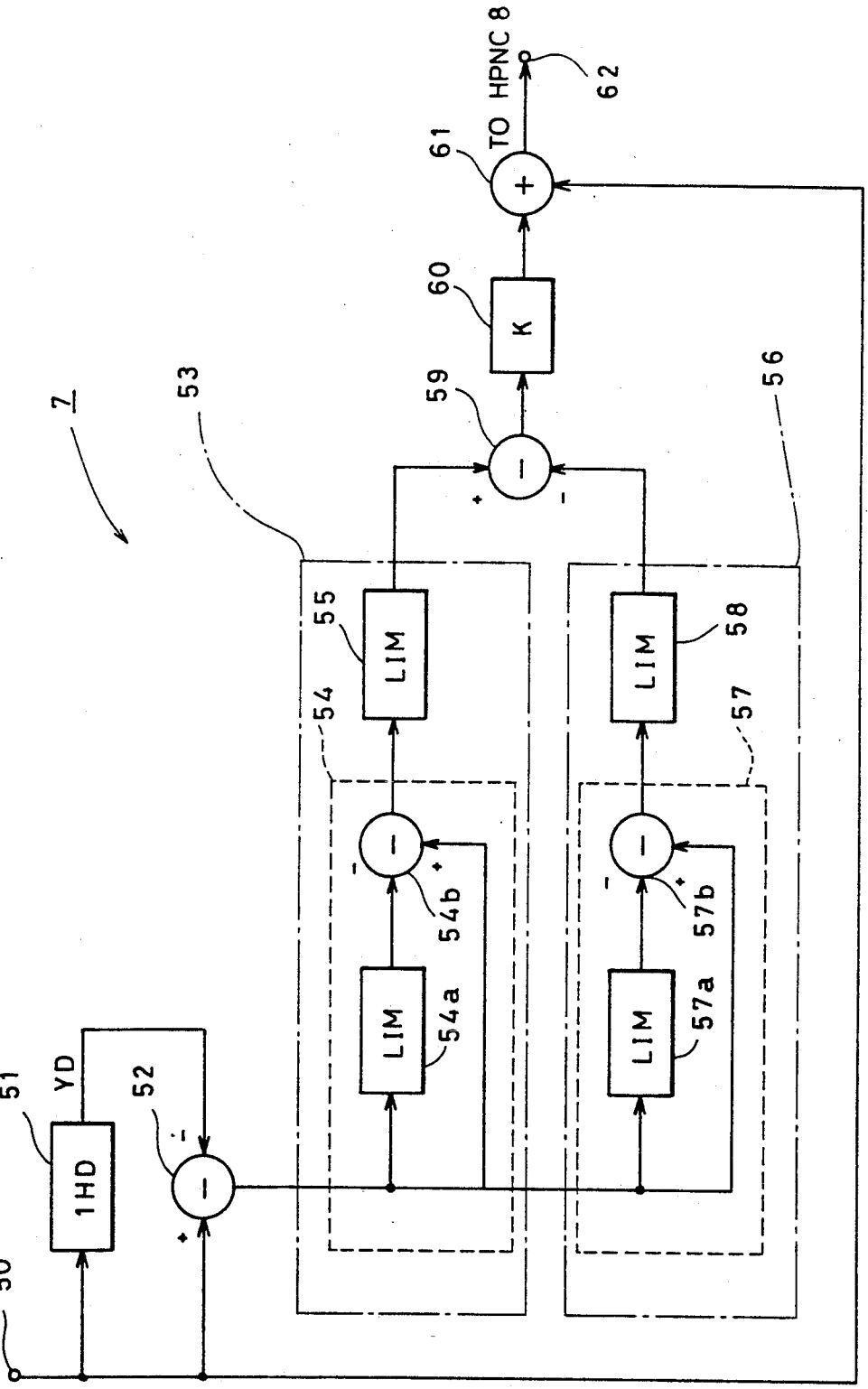
FIG. 6 is a block diagram illustrating a vertical resolution correcting circuit for the luminance signal according to a first embodiment of the present invention.

FIG. 6 is a block diagram illustrating a vertical resolution correcting circuit 7 according to an embodiment of the present invention. Referring to FIG. 6, a reproduced luminance signal Y is applied from luminance signal processing circuit 6 in FIG. 1 through an input terminal 50 to circuit 7 and applied to an nH delay line (n is a positive integer, 1 in this embodiment) 51, to a positive input of a subtracter 52, and to one input of an adder 61. Reproduced luminance signal YD, which has been delayed a period of 1H in 1H delay line 52, is applied to a negative input of subtracter 52, and subtracter 52 provides a noncorrelation component |Y-YD| in a vertical direction of the luminance signal.

The noncorrelation component is applied through a limiter 54a to a negative input of a subtracter 54b and also applied directly to a positive input of subtracter 54b. Limiter 54a and subtracter 54b constitute a coring circuit 54. The noncorrelation component provided from subtracter 52 is further applied through a limiter 57a to a negative input of a subtracter 57b and also applied directly to a positive input of subtracter 57b. Limiter 57a and subtracter 57b constitute a coring circuit 57.

Now, limiter 54a, which has a limiter level of 6·IRE, provides an input at a level within the range of 0·IRE to 6·IRE as it is, and, when the level of the input is 6·IRE or more, provides a fixed output of 6·IRE. Subtracter 54b subtracts the output of limiter 54a from the input of limiter 54a, so that the output of subtracter 54b is 0 when the noncorrelation component provided from subtracter 52 is at a level within the range of 0·IRE to 6·IRE, and, when the level of the noncorrelation component is 6·IRE or more, a component at a level obtained by subtracting 6·IRE from the noncorrelation component is provided.

The output of subtracter 54b is applied to a limiter 55 having a limiter level of 17·IRE. Limiter 55 provides an input at a level within the range of 0·IRE to 17·IRE as it is and, when the level of the input is 17·IRE or more, provides a fixed output of 17·IRE. Accordingly, when the noncorrelation component provided from subtracter 52 is within the range of 0·IRE to 6·IRE, the output from limiter 55 is 0 level, and, when the noncorrelation component is within the range of 6·IRE to 23 (=6+17)·IRE, limiter 55 provides a component at a level obtained by subtracting 6·IRE from the noncorrelation component, and, when the noncorrelation component is 23·IRE or more, limiter 55 provides a fixed output of 17·IRE. The above-described coring circuit 54 and limiter 55 constitute an increasing characteristic determining circuit 53.

Limiter 57a has a limiter level of 23·IRE. Limiter 57a provides an input at a level within the range of 0·IRE to 23·IRE as it is and, when the level of the input is 23·IRE or more, provides a fixed output of 23·IRE. Subtracter 57b subtracts the output of limiter 57a from the input of limiter 57a, so that the output of subtracter 57b is 0 when the noncorrelation component provided from subtracter 52 is at a level within the range of 0·IRE to 23·IRE, and, when the level of the noncorrelation component is 23·IRE or more, a component at a level obtained by subtracting 23·IRE from the noncorrelation component is provided.

The output of subtracter 57b is applied to a limiter 58 having a limiter level of 17·IRE. Limiter 58 provides an input at a level within the range of 0·IRE to 17·IRE as it is and, when the level of the input is 17·IRE or more, provides a fixed output of 17·IRE, similarly to limiter 55. Therefore, when the noncorrelation component provided from subtracter 52 is within the range of 0·IRE to 23·IRE, the output from limiter 58 is at 0 level, and, when the noncorrelation component is within the range of 23·IRE to 40 (=23+17)·IRE, limiter 58 provides a component at a level obtained by subtracting 23·IRE from the noncorrelation component, and, when the noncorrelation component is 40·IRE or more, limiter 58 provides a fixed output of 17·IRE. The above-described coring circuit 57 and limiter 58 constitute a decreasing characteristic determining circuit 56.

An output of the above-described increasing characteristic determining circuit 53 is applied to a positive input of a subtracter 59, and an output of decreasing characteristic determining circuit 56 is applied to a negative input of subtracter 59. An output of subtracter 59 is multiplied by K in a K multiplying circuit 60, then applied to another input of adder 61, and added to the reproduced luminance signal supplied from terminal 50.

Figure 7:
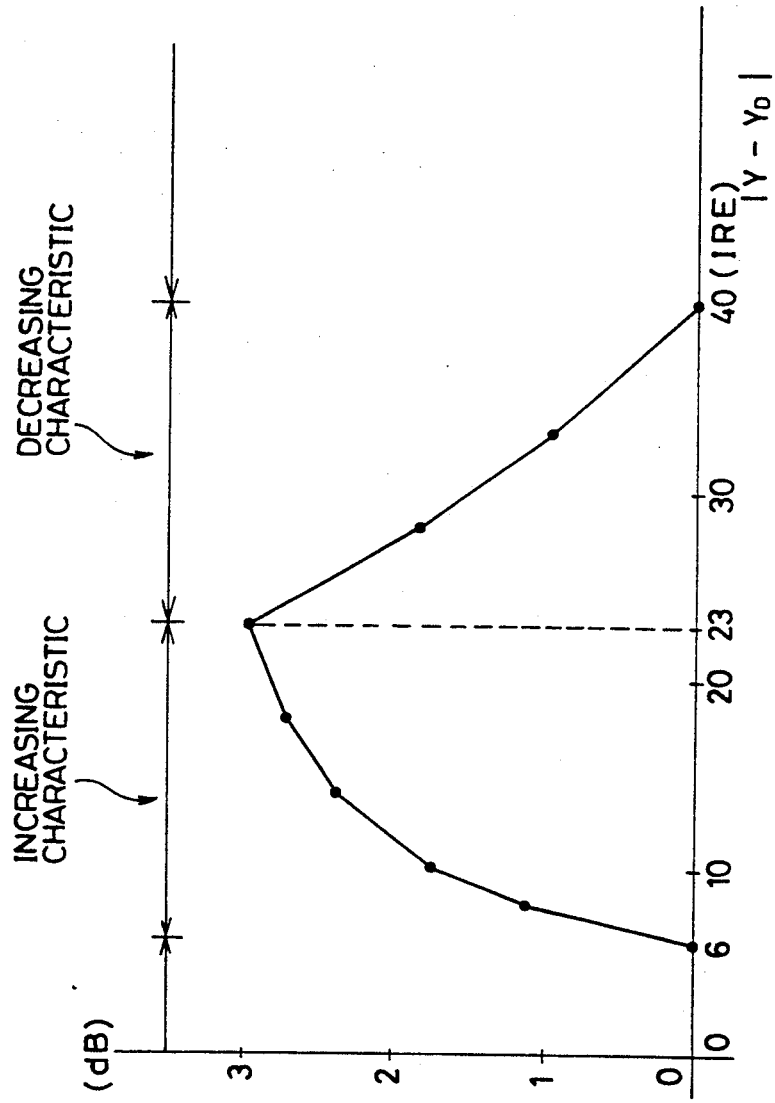
FIG. 7 is a graph showing an operating characteristic of the embodiment illustrated in FIG. 6.

FIG. 7 is a graph showing the relation between the level of the noncorrelation component (indicated on the abscissa) and the amount of emphasis, which is the output of K multiplying circuit 60 (indicated on the ordinate), i.e. a characteristic of emphasis on the level of the luminance signal. Specifically, if the output of limiter 58, which is 0 in the range of 0·IRE to 23·IRE, increases in the range of 23·IRE to 40·IRE, and is fixed at 17·IRE in the range of 40·IRE or more as described above, as described above is subtracted from the output of limiter 55, which is 0 in the range of 0·IRE to 6·IRE, increases in the range of 6·IRE to 23·IRE, and is fixed at 17·IRE in the range of 23·IRE or more as described above, an amount of emphasis having increasing and decreasing characteristic, which is 0 in the range of 0·IRE to 6·IRE, increases in the range of 6·IRE to 23·IRE, decreases in the range of 23·IRE to 40·IRE, and is 0 in the range of 40·IRE or more as shown in FIG. 7, is obtained and added to reproduced luminance signal Y.

As a result, in a region where the level of the noncorrelation component is lower than 6·IRE, it does not happen that a noise component is emphasized and added to reproduced luminance signal Y, while, in a region where the level of the noncorrelation component is in the range of 6·IRE to 40·IRE, an emphasis component is added to the reproduced luminance signal, and a contour in the vertical direction is emphasized. The emphasis component gently increases and decreases as shown in FIG. 7, so that it does not cause particular visual unnaturalness in a reproduced image. Furthermore, addition of the emphasis component is not performed when the level of the noncorrelation component is 40·IRE or more, so that even if a synchronizing pulse or an equalizing pulse having an amplitude of 40·IRE is erroneously detected as the noncorrelation component, it does not happen that the emphasis component is added unnecessarily to a video signal.

The emphasis component to be actually added is determined according to the value of a coefficient K of the K multiplying circuit 60. For example, as shown in FIG. 7, in order to set the maximal amount of addition for the noncorrelation component of 23·IRE to be 3 dB, it may be derived that K=0.558 from the following expression:

$$(23 + K*17)/23 = 10 \text{ EXP } (3/10)$$

As described above, according to the first embodiment of the present invention illustrated in FIG. 6, the level of a reproduced luminance signal is emphasized with a predetermined characteristic only when a noncorrelation component of the luminance signal has an intermediate level, so that it is possible to emphasize a contour in a vertical direction of an image without emphasizing a noise component having a low noncorrelation component level and without causing malfunction due to an equalizing pulse or a synchronizing pulse, and it is possible to enhance resolution of a reproduced image.

Figure 8:
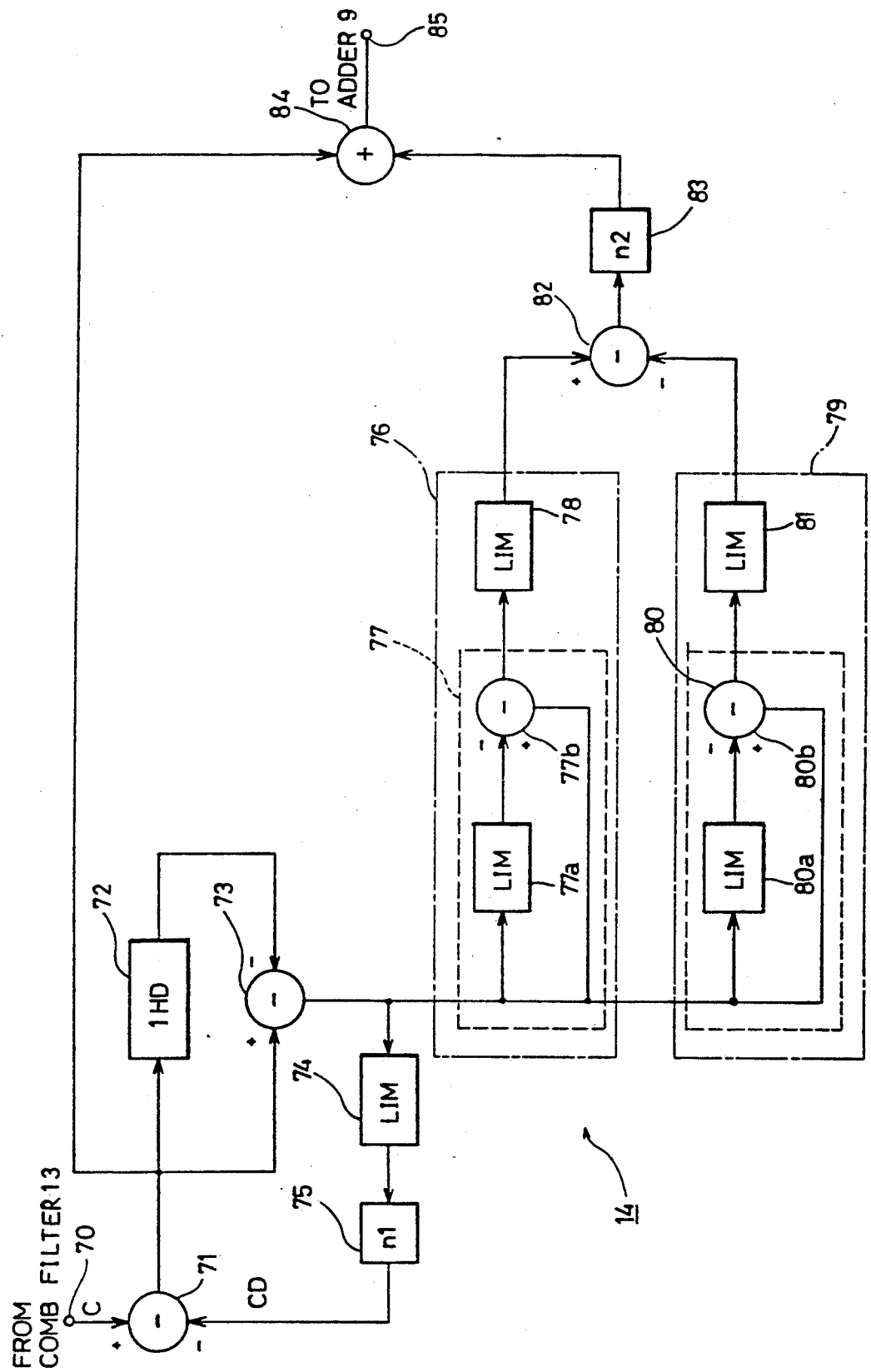
FIG. 8 is a block diagram illustrating a vertical resolution correcting circuit for the chroma signal according to a second embodiment of the present invention.

Next, FIG. 8 is a block diagram illustrating a vertical resolution correcting circuit 14 according to a second embodiment of the present invention. Referring to FIG. 8, a chroma signal C, which has been applied from comb filter 13 in FIG. 1 through an input terminal 70 to circuit 14, is applied to a positive input of a subtracter 71. An output of subtracter 71 is applied to a 1H delay line 72, to a positive input of a subtracter 73, and to one input of an adder 84. The chroma signal, which has been delayed by a period of 1H in 1H delay line 72, is applied to a negative input of subtracter 73, and a noncorrelation component in a vertical direction of the chroma signal is provided from subtracter 73.

Figure 9:
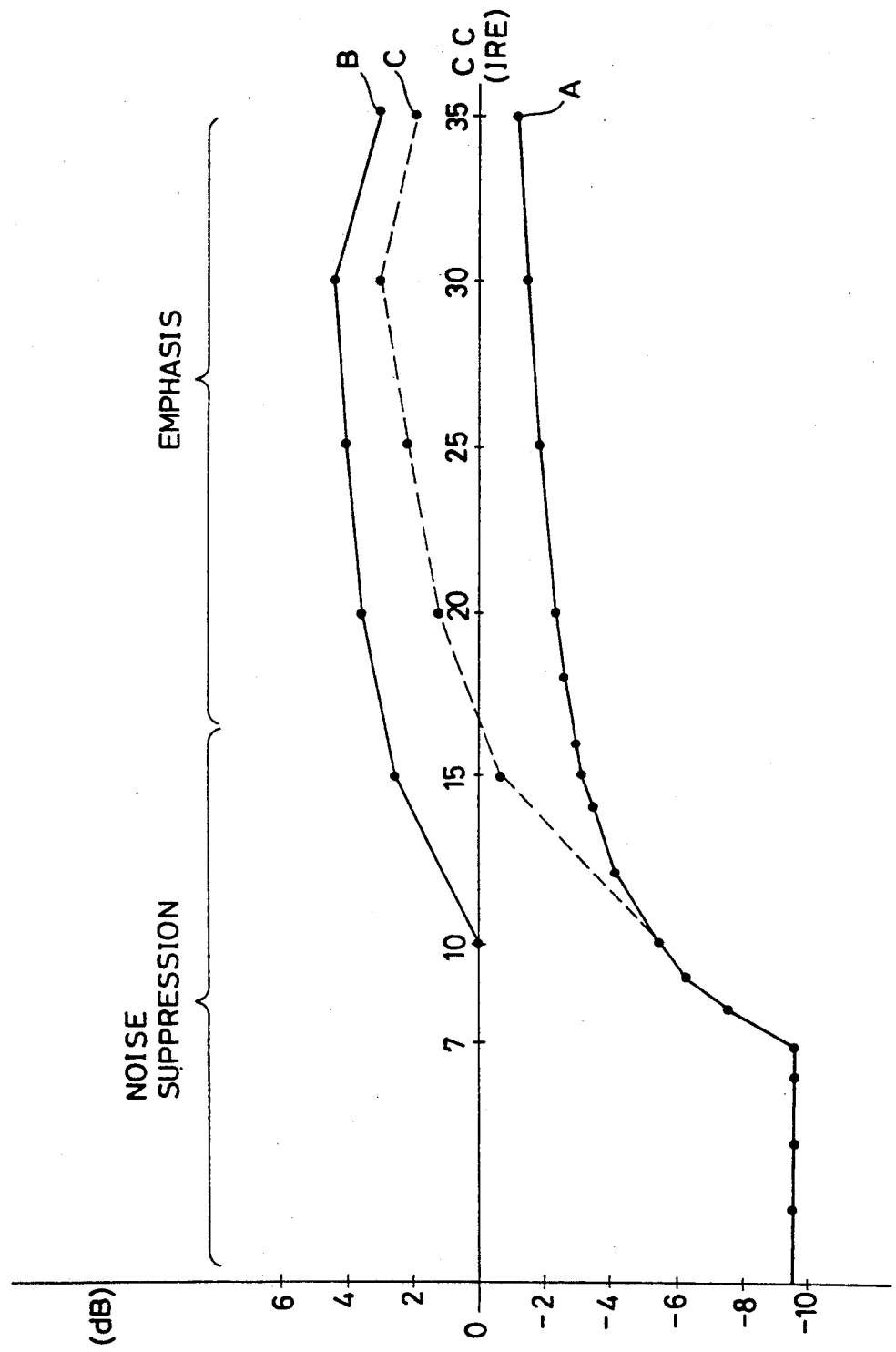
FIG. 9 is a graph showing an operating characteristic of the embodiment illustrated in FIG. 8.

The noncorrelation component is fed back, through a limiter 74 having a limiter level of 7·IRE and an n1 multiplying circuit 75, to a negative input of subtracter 71. If the negative input of subtracter 71 on which predetermined processing has been performed through limiter 74 and n1 multiplying circuit 75 is expressed as CD, subtraction of C-CD is performed in subtracter 71. Limiter 74, n1 multiplying circuit 75, and subtracter 71 are provided for suppressing a low level noise of the chroma signal. Specifically, it is considered that the detected noncorrelation component of the chroma signal, particularly, the component having a level of 7·IRE or less, almost includes only a noise component, so that the noncorrelation component of 7·IRE or less is multiplied by n1 and subtracted from chroma signal C to suppress the low level noise component. A solid line A in FIG. 9 shows a noise suppressing characteristic in a case where the value n1=1 is set.

The noncorrelation component supplied from subtracter 73 is applied through a limiter 77a to a negative input of a subtracter 77b and also applied directly to a positive input of subtracter 77b. Limiter 77a and subtracter 77b constitute a coring circuit 77. The noncorrelation component provided from subtracter 73 is further applied through a limiter 80a to a negative input of a subtracter 80b and also applied directly to a positive input of subtracter 80b. Limiter 80a and subtracter 80b constitute a coring circuit 80.

Now, limiter 77a has a limiter level of 10·IRE. Limiter 77a provides an input at a level within the range of 0·IRE to 10·IRE as it is and, when the level of the input is 10·IRE or more, provides a fixed output of 10·IRE. Subtracter 77b subtracts the output of limiter 77a from the input of limiter 77a, so that, when the noncorrelation component provided from subtracter 73 is at a level within the range of 0·IRE to 10·IRE, the output of subtracter 77b is 0, and, when the level of the noncorrelation component is 10·IRE or more, a component at a level obtained by subtracting 10·IRE from the noncorrelation component is provided.

The output of subtracter 77b is applied to a limiter 78 having a limiter level of 20·IRE. Limiter 78 provides an input at a level within the range of 0·IRE to 20·IRE as it is and, when the level of the input is 20·IRE or more, provides a fixed output of 20·IRE. Accordingly, when the noncorrelation component provided from subtracter 73 is in the range of 0·IRE to 10·IRE, the output from limiter 78 is at 0 level, and, when the noncorrelation component is within the range of 10·IRE to 30 (=10+20)·IRE, limiter 78 provides a component at a level obtained by subtracting 10·IRE from the noncorrelation component, and, when the noncorrelation component is 30·IRE or more, limiter 78 provides a fixed output of 20·IRE. The above-described coring circuit 77 and limiter 78 constitute an increasing characteristic determining circuit 76.

Limiter 80a has a limiter level of 30·IRE. Limiter 80a provides an input at a level within the range of 0·IRE to 30·IRE as it is and, when the level of the input is 30·IRE or more, provides a fixed output of 30·IRE. Subtracter 80b subtracts the output of limiter 80a from the input of limiter 80a, so that, when the noncorrelation component provided from subtracter 73 is at a level within the range of 0·IRE to 30·IRE, the output of subtracter 80b is 0, and, when the level of the noncorrelation component is 30·IRE or more, a component at a level obtained by subtracting 30·IRE from the noncorrelation component is provided.

The output of subtracter 80b is applied to a limiter 81 having a limiter level of 20·IRE. Limiter 81 provides an input at a level within the range of 0·IRE to 20·IRE as it is and, when the level of the input is 20·IRE or more, provides a fixed output of 20·IRE, similarly to limiter 78. Accordingly, when the noncorrelation component provided from subtracter 73 is within the range of 0·IRE to 30·IRE, the output from limiter 81 is at 0 level, and, when the noncorrelation component is within the range of 30·IRE to 50 (=30+20)·IRE, limiter 81 provides a component at a level obtained by subtracting 30·IRE from the noncorrelation component, and, when the noncorrelation component is 50·IRE or more, limiter 81 provides a fixed output of 20·IRE. The above-described coring circuit 80 and limiter 81 constitute a decreasing characteristic determining circuit 79.

The output of the above-described increasing characteristic determining circuit 76 is applied to a positive input of a subtracter 82, and the output of decreasing characteristic determining circuit 79 is applied to a negative input of subtracter 82. An output of subtracter 82 is multiplied by n2 in an n2 multiplying circuit 83, then applied to another input of adder 84, and added to the chroma signal provided from subtracter 71.

A solid line B in FIG. 9 shows an emphasis characteristic of the level of the chroma signal. Specifically, if the output of limiter 81, which is 0 in the range of 0·IRE to 30·IRE, increases in the range of 30·IRE to 50·IRE, and is fixed at 20·IRE in the range of 50·IRE or more as described above, is subtracted from the output of limiter 78, which is 0 in the range of 0·IRE to 10·IRE, increases in the range of 10·IRE to 30·IRE, and is fixed at 20·IRE in the range of 30·IRE or more as described above, an emphasis component having an increasing and decreasing characteristic, which is 0 in the range of 0·IRE to 10·IRE, increases in the range of 10·IRE to 30·IRE, decreases in the range of 30·IRE to 50·IRE, and becomes 0 in the range of 50·IRE or more as partially shown in FIG. 9, is obtained and added to the chroma signal C. Specifically, in cases where the noncorrelation component of the chroma signal is 10·IRE or less and in cases where it is 50·IRE or more, emphasizing of the chroma signal is not performed.

Now, a broken line C in FIG. 9 shows a general characteristic of vertical resolution correcting circuit 14, which is obtained by synthesizing noise suppression performed by limiter 74, n1 multiplying circuit 75 and subtracter 71 in FIG. 8 and the characteristic of emphasizing performed by the above-described increasing characteristic determining circuit 76 and decreasing characteristic determining circuit 79. As seen from broken line C, a noncorrelation component at a low level is canceled as a noise component from the chroma signal, and emphasizing of the chroma signal is performed for a noncorrelation component at an immediate level. As a result, it is possible to correct chromatic blur of the chroma signal which is caused by crosstalk removing processing performed by comb filter 13 when the noncorrelation component in the vertical direction is in the range of 10·IRE to 50·IRE.

In order to set emphasis for a noncorrelation component of 30·IRE to be 3 dB and set suppression for a noncorrelation component of 7·IRE or less to be −10 dB, the values of coefficients n1, n2 may be set to be n1=n2=1.

As described above, according to the second embodiment of the present invention illustrated in FIG. 8, a low level noncorrelation component of a chroma signal is subtracted from the chroma signal, and the level of the chroma signal is emphasized with a predetermined characteristic when the noncorrelation component of the chroma signal has an intermediate level, so that it is possible to remove a noise component at a low level and to enhance resolution of an image with a relatively simple structure not using a proportional switch as in the case of the conventional example and without causing malfunction due to a luminance signal component.

Although the above-described first and second embodiments are concerned with cases where the present invention is applied to a reproduction system in a VCR, it is apparent that the present invention is also applicable to a recording system in a video recording and reproduction apparatus such as a VCR.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vertical resolution correcting circuit for a video signal, comprising:
   means for supplying a luminance signal included in the video signal;
   means for detecting a noncorrelation component in a vertical direction of said luminance signal; and
   means for emphasizing the level of said luminance signal with a predetermined characteristic, which increases and decreases according to the level of said detected noncorrelation component over a predetermined intermediate range included in the whole range which can be taken by said detected noncorrelation component and provides a zero correction for said chroma signal level for detected values of said noncorrelation component above and below said predetermined intermediate range.

2. The vertical resolution correcting circuit according to claim 1, wherein said level emphasizing means includes:
   emphasis component generating means for generating an emphasis component for the level of said luminance signal on the basis of said predetermined characteristic; and
   a first addition means for adding said emphasis component generated by said emphasis component generating means to said supplied luminance signal.

3. The vertical resolution correcting circuit according to claim 2, wherein said emphasis component generating means includes:
   increasing characteristic determining means for determining an emphasis characteristic which increases according to the level of said detected noncorrelation component in a lower first range in said predetermined intermediate range;
   decreasing characteristic determining means for determining an emphasis characteristic which decreases according to the level of said detected noncorrelation component in a higher second range in said predetermined intermediate range; and
   first subtraction means for subtracting an output of said decreasing characteristic determining means from an output of said increasing characteristic determining means.

4. The vertical resolution correcting circuit according to claim 3, wherein said emphasis component generating means further includes means for multiplying an output of said first subtraction means by a predetermined coefficient (K).

5. The vertical resolution correcting circuit according to claim 1, wherein said means for detecting said noncorrelation component includes:
   delaying means for delaying said supplied luminance signal by a period of nH (n is a positive integer, and H is a horizontal synchronization period); and
   subtraction means for subtracting an output of said delaying means from said supplied luminance signal.

6. A vertical resolution correcting circuit for a video signal, comprising:
   means for supplying a chroma signal included in said video signal;
   means for detecting a noncorrelation component in a vertical direction of said chroma signal;
   noise canceling means for subtracting a level within a lower predetermined first range included in the whole range which can be taken by said detected noncorrelation component from the level of said supplied chroma signal; and
   means for emphasizing the level of said chroma signal with a predetermined characteristic, which increases and decreases according to the level of said detected noncorrelation component, in a predetermined intermediate second range included in the whole range which can be taken by said detected noncorrelation component and provides a zero correction for said chroma signal level for detected values of said noncorrelation component above and below said predetermined intermediate range.

7. The vertical resolution correcting circuit according to claim 6, wherein said noise canceling means includes:
   first limiter means for limiting the level of said detected noncorrelation component to a predetermined first limiter level;
   first multiplication means for multiplying an output of said first limiter means by a predetermined coefficient (n1); and
   first subtraction means for subtracting an output of said first multiplication means from said supplied chroma signal.

8. The vertical resolution correcting circuit according to claim 7, wherein said level emphasizing means includes:
   emphasis component generating means for generating an emphasis component for said chroma signal level on the basis of said predetermined characteristic; and
   first addition means for adding said emphasis component generated by said emphasis component generating means to said supplied chroma signal.

9. A vertical resolution correcting circuit for a video signal, comprising:
   means for supplying a chroma signal included in said video signal;
   means for detecting a noncorrelation component in a vertical direction of said chroma signal;
   noise cancelling means for subtracting a level within a lower predetermined first range included in the whole range which can be taken by said detected noncorrelation component from the level of said supplied chroma signal, said noise cancelling means including:
   first limiter means for limiting the level of said detected noncorrelation component to a predetermined first limiter level;
   first multiplication means for multiplying an output of said first limiter means by a predetermined coefficient (n1); and
   first subtraction means for subtracting an output of said first multiplication means from said supplied chroma signal;
   level emphasizing means including emphasis component generating means for generating an emphasis component for said chroma signal level on the basis of said predetermined characteristic said emphasis component generating means including:

means for emphasizing the level of said chroma signal with a predetermined characteristic, which increases and decreases according to the level of said detected noncorrelation component, in a predetermined intermediate second range included in the whole range which can be taken by said detected noncorrelation component;

increasing characteristic determining means for determining an emphasis characteristic which increases according to the level of said detected noncorrelation component in a lower third range included in said predetermined intermediate second range;

decreasing characteristic determining means for determining an emphasis characteristic which decreases according to the level of said detected noncorrelation component in a higher fourth range included in said predetermined intermediate second range; and second subtraction means for subtracting an output of said decreasing characteristic determining means from an output of said increasing characteristic determining means; and first addition means for adding said emphasis component generated by said emphasis component generating means to said supplied chroma signal, and 10. The vertical resolution correcting circuit according to claim 9, wherein said emphasis component generating means further includes means for multiplying an output of said second subtraction means by a predetermined coefficient (n2).

11. The vertical resolution correcting circuit according to claim 10, wherein said increasing characteristic determining means includes:

second limiter means for limiting the level of said detected noncorrelation component to a predetermined second limiter level higher than said first limiter level;

third subtraction means for subtracting an output of said second limiter means from said detected noncorrelation component; and third limiter means for limiting the level of an output of said third subtraction means to a third limiter level higher than said second limiter level, and wherein said decreasing characteristic determining means includes:

fourth limiter means for limiting the level of said detected noncorrelation component to a fourth limiter level equal to the sum of said second limiter level and said third limiter level;

fourth subtraction means for subtracting an output of said fourth limiter means from said detected noncorrelation component; and fifth limiter means for limiting the level of said fourth subtraction means to said third limiter level.

12. A vertical resolution correcting circuit for a video signal, comprising:

means for supplying a chroma signal included in said video signal;

means for detecting a noncorrelation component in a vertical direction of said chroma signal;

noise cancelling means for subtracting a level within a lower predetermined first range included in the whole range which can be taken by said detected noncorrelation component from the level of said supplied chroma signal;

said noise cancelling means including:

first limiter means for limiting the level of said detected noncorrelation component to a predetermined first limiter level;

first multiplication means for multiplying an output of said first limiter means by a predetermined coefficient (n1); and first subtraction means for subtracting an output of said first multiplication means from said supplied chroma signal;

said means for detecting a noncorrelation component including:

delaying means for delaying an output of said first subtraction means by a period of nH (n is a positive integer, and H is a horizontal synchronization period); and subtraction means for subtracting an output of said delaying means from an output of said first subtraction means; and means for emphasizing the level of said chroma signal with a predetermined characteristic, which increases and decreases according to the level of said detected noncorrelation component, in a predetermined intermediate second range included in the whole range which can be taken by said detected noncorrelation component.

13. A vertical resolution correcting for a video signal, comprising:

means for supplying a luminance signal included in the video signal;

means for detecting a noncorrelation component in a vertical direction of said luminance signal;

level emphasizing means for emphasizing the level of said luminance signal with a predetermined characteristic, which increases and decreases according to the level of said detected noncorrelation component over a predetermined intermediate range included in the whole range which can be taken by said detected noncorrelation component;

said level emphasizing means including:

emphasis component generating means for generating an emphasis component for the level of said luminance signal on the basis of said predetermined characteristic, and a first addition means for adding said emphasis component generated by said emphasis component generating means to said supplied luminance signal;

said emphasis component generating means including:

increasing characteristic determining means for determining an emphasis characteristic which increases according to the level of said detected noncorrelation component in a lower first range in said predetermined intermediate range, decreasing characteristic determining means for determining an emphasis characteristic which decreases according to the level of said detected noncorrelation component in a higher second range in said predetermined intermediate range, and first subtraction means for subtracting an output of said decreasing characteristic determining means from an output of said increasing characteristic determining means;

said increasing characteristic determining means including:

first limiter means for limiting the level of said detected noncorrelation component to a predetermined first limiter level, second subtraction means for subtracting an output of said first limiter means from said detected noncorrelation component, and second limiter means for limiting the level of an output of said second subtraction means to a second limiter level higher than said first limiter level; and said decreasing characteristic determining means including:

third limiter means for limiting the level of said detected noncorrelation component to a third limiter level equal to the sum of said first limiter level and said second limiter level, third subtraction means for subtracting an output of said third limiter means from said detected noncorrelation component, and fourth limiter means for limiting the level of an output of said third subtraction means to said second limiter level.

* * * * *